US006370455B1

(12) United States Patent
Larson et al.

(10) Patent No.: US 6,370,455 B1
(45) Date of Patent: Apr. 9, 2002

(54) METHOD AND APPARATUS FOR NETWORKED WHEEL ALIGNMENT COMMUNICATIONS AND SERVICE

(75) Inventors: Timothy A. Larson, Ferguson; Nicholas J. Colarelli, Creve Coeur; Timothy A. Strege, Ballwin; Richard L. Brandt, Florissant, all of MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/655,777

(22) Filed: Sep. 5, 2000

(51) Int. Cl.[7] .............................................. G01M 17/00
(52) U.S. Cl. ........................................... 701/33; 701/29
(58) Field of Search ............................. 701/29, 30, 33, 701/34; 73/117.2, 177.3, 121

(56) References Cited

U.S. PATENT DOCUMENTS

| | | | | |
|---|---|---|---|---|
| 4,404,639 | A | 9/1983 | McGuire et al. | 364/551 |
| 5,473,772 | A | 12/1995 | Halliwell et al. | 395/650 |
| 5,657,233 | A | 8/1997 | Cherrington et al. | 364/464.1 |
| 5,717,595 | A | 2/1998 | Cherrington et al. | 364/464.1 |
| 5,893,113 | A | 4/1999 | McGrath et al. | 707/200 |
| 5,960,204 | A | 9/1999 | Yinger et al. | 395/712 |
| 6,052,531 | A | 4/2000 | Waldin, Jr. et al. | 395/712 |

FOREIGN PATENT DOCUMENTS

| | | |
|---|---|---|
| WO | WO9851991 | 11/1998 |
| WO | WO9923783 | 5/1999 |

OTHER PUBLICATIONS

Discovery of Web Services (Microsoft Corporation) The Programmable Web:Web Services Provides Building Blocks for the Microsoft.NET Framewor Simple Object Access Protocol No Date.

Microsoft.net © 2000; 5 pages; XML, Web Services, and the .NET Framework no month.

Microsoft.net© 2001; 3 pages; The .NET Framework and COM no month.

Microsoft Business © 2001; 23 pages; Building the Future no month.

Microsoft Business © 2001; 6 pages; Building the Future no month.

*Primary Examiner*—Jonel Beaulieu
(74) *Attorney, Agent, or Firm*—Folster, Lieder, Woodruff & Lucchesi, LC

(57) ABSTRACT

A wheel alignment system including at least one sensing device for acquiring automotive data, interface circuitry in communication with the sensing device for generating data representative of automotive data acquired by the sensing device, and a host computer in communication with the interface circuitry for performing a sequence of operations on the data generated by the interface circuitry. The host computer provides integrated Internet access to allow for transmission to the vehicle wheel alignment system, from a remote server, via the Internet, updated information and software applications and components necessary to accurately diagnose a vehicle, and the return of diagnostic, statistical, and log information associated with the vehicle wheel alignment system. The host computer provides integrated Internet access to allow for transmission of electronic commerce and statistical information, alignment logs, error messages, status messages, or diagnostic information to a remote system, and for the receipt of information including updated software applications, diagnostic commands, and remote information queries therefrom.

46 Claims, 6 Drawing Sheets

METHOD AND APPARATUS FOR NETWORKED WHEEL ALIGNMENT COMMUNICATIONS AND SERVICE

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to automotive service equipment, and more particularly to a method for remote access to, and diagnosis of, software applications and hardware configurations of a vehicle wheel alignment system computer interconnected via a local or global network, such as the Internet, to a remote computer system to facilitate maintenance, repair, and efficient operation thereof.

As described in co-pending U.S. patent application Ser. No. 09/388,730 filed Sep. 2, 1999, herein incorporated by reference, and in co-pending U.S. patent application Ser. No. 09/587,637 filed Jun. 5, 2000, it is desirable that a general purpose computer associated with an automotive diagnostic or service system such as a vehicle wheel alignment system include an operating system which is fully compatible with local and global computer networks such as the Internet to exchange information with remote computers and databases. Examples of such currently available 32-bit operating systems include the Microsoft Windows™ OS family of products, such as Windows 2000 and Windows CE, and Palm Computing's Palm OS products, all capable of running Internet browser software such as Microsoft's Internet Explorer or Netscape's Communicator. Future operating systems utilizing a 64-bit, 128-bit, or $2^n$-bit bases are anticipated as suitable logical extensions of current operating systems as computer hardware technology improves. Additional computing products on which vehicle wheel alignment systems having Internet access may be implemented include tablet-type computers and pocket-type computers, both of which would be form factors highly suited for use in an automotive repair shop environment.

Such a vehicle wheel alignment system further should provide improved Internet integration of the automotive diagnostic or wheel alignment system when compared to conventional automotive diagnostic or vehicle wheel alignment systems. For example, a vehicle wheel alignment system utilizing Internet integration should include an ability to utilize Microsoft's standard or compact versions of "dot"-NET (or NET) Web Services, which are building blocks for constructing distributed Internet or web-based applications in a platform, object model, and multi-language manner. These "dot"-NET Web Services are based upon open Internet standards and protocols, such as HTTP and XML, and provide a URL-addressable resource which programmatically returns information to systems who want to use it, without the systems needing to know how the service has been implemented. Specifically, Web Services represents black-box functionality which may be reused without concern for how the service is implemented, by providing well-defined user interfaces, known as "contracts," which describe the features of the service. In this manner, vehicle wheel alignment applications can be assembled from a variety of components, consisting of remote services accessed via the Internet, local services, and custom software written in an intermediate language, any of several computer languages including C#, Visual Basic, C++, Cobol, Perl, Java, JScript and VBScript, and may utilize component object model (COM) and distributed COM (DCOM) standards. Individual "dot"-NET Web Services and components can be further enhanced by using "inheritance" properties to extend the capabilities of existing components. These remote and local services and custom software may further utilize a standard "dot"-NET framework or information exchange protocol, such as Microsoft's Simple Object Access Protocol (SOAP) to exchange information over the Internet. The SOAP methodology provides a lightweight protocol for the exchange of information in a decentralized and distributed environment, such as the Internet. SOAP is an XML based protocol which consists of three parts, an envelope for defining a framework for the contents of a message and the manner in which it is to be processed, a set of encoding rules for expressing datatypes, and a convention for representing remote procedure calls and responses.

In contrast, conventional general purpose computers included in traditional vehicle wheel alignment systems may provide limited access to a network of computers (e.g., LAN) and to the Internet. Traditional vehicle wheel alignment systems generally do not integrate the Internet into associated automotive service, maintenance, repair or inspection software, such as wheel alignment diagnostic software. Instead, the associated computer operates as would any other PC, configured to browse the Internet without fully integrating the Internet into the system software to utilize the availability of remote access and information exchange. Therefore, it is desirable to develop an automotive diagnostic or repair system such as a vehicle wheel alignment system which integrates local or global computer networks such as the Internet into the wheel alignment system software to provide a more efficient and accurate system than is currently available. The integrated Internet application centralizes maintenance of software applications, components, and services, remote system diagnosis, and the remote gathering of useful statistical and logging information.

For example, when a software or hardware failure occurs in a conventional vehicle wheel alignment system, a repair technician cannot determine the operational status of the equipment other than by visiting the location at which the automotive diagnostic or repair system is installed to inspect the machine and to question shop personnel. Additionally, each repair technician is required to bring software replacements and updates to each physical location visited, so as to be able to diagnose and repair problems on a wide variety of vehicle wheel alignment systems without the need for return visits. Finally, there is currently no repository for statistical and status information related to individual units and to groups of vehicle wheel alignment systems. Collections of information such as system usage, configurations, downtime, vehicle wheel alignment procedures performed, and software component applications such as services can be utilized to provide beneficial guidance for the development, maintenance and repair of a variety of different automotive diagnostic and repair systems, as well as increased vehicle repair shop efficiency. Therefore, it is desirable to provide a vehicle wheel alignment system that allows for nearly instantaneous bi-directional, information access via a local or global computer network (e.g., the Internet) so that data and commands such as current status information and statistics, software updates, component objects, and services such as alignment, diagnostic, or repair routines can be readily accessed and utilized by repair technicians at a remote system during the maintenance of the vehicle wheel alignment system.

A system and method for distributed computer automotive service equipment is described in International Application No. WO 99/23783 to Snap-on Technologies, Inc. wherein computerized automotive service equipment is adapted to access one or more remotely located computer systems to retrieve or exchange the data and/or software necessary analyze and diagnose a vehicle undergoing service. For example, in the WO 99/23783 application, raw data from vehicle wheel alignment sensors mounted on a vehicle wheel is received a local computer, and then transmitted to a remote system over a network wherein the raw data is processed and vehicle wheel alignment angles returned over the network to the local computer for display to a technician. Additionally disclosed are similar applications for engine analyzers and brake testers, as well as the transfer and exchange of vehicle OEM specifications from the remote system over the network to the local computers. However, the WO 99/23783 application does not incorporate any features for the collection of data pertaining to the operation of the individual sensors and local computers and equipment, or for the remote diagnosis and repair thereof in the event a fault is identified.

U.S. Pat. No. 5,657,233 to Cherrington et al. discloses an integrated highly automated vehicle analysis system employing at least one technician terminal for displaying a plurality of inspection screens and for entering inspection results from which a report is generated. The '233 Cherrington et al. technician terminal may be coupled to a point-of-sale terminal through a network, which is used to generate a cost estimate report in response to an inspection report generated by the technician terminal. The '233 Cherrington et al. system includes a plurality of electronic databases for storing vehicle specifications, customer records, and a parts catalog database. Additionally disclosed in the '233 Cherrington et al. system is the interconnection between a plurality of point-of-sale terminals and a central server for the purpose of storing customer records and vehicle inspection reports in a central location. However, the '233 Cherrington et al. system does not incorporate any features for the collection of data pertaining to the operation of the individual vehicle sensors and local service computers or equipment, or for the remote diagnosis and repair thereof in the event a fault is identified.

A basic system for automatically updating static and dynamic files at a network node in response to instructions of an application program is set forth in U.S. Pat. No. 5,473,772 to Halliwell et al. The '772 Halliwell et al. patent describes a data processing network in which specific and complicated control logic is utilized to coordinate the updating, creation, and deletion of files on a work station computer from a host computer. In the '772 Halliwell system, the control logic is responsive to calls issued by, or on behalf of, an application which is invoked by a user at the work station computer to determine if a file or set of files is the most up-to-date version available. If it is not, the control logic coordinates the acquisition of the most up-to-date version of the files from the host computer, deleting obsolete and unused files in the process. However, the '772 Halliwell et al. patent does not provide any method or application for remote access to, and diagnosis of, the work station computer by the host computer.

A similar network-based software application update system is disclosed in U.S. Pat. No. 5,960,204 to Yinger et al. The '204 Yinger et al. patent sets forth a data processing system for installation of a computer application on a client/server network on an as needed basis. In the '204 Yinger et al. system, the control logic seeks out the most up-to-date versions of an application only when a user selects and runs an existing version of that application. The goal of the '204 Yinger et al. patent is to provide an automated software update system which is transparent to the user, and is capable of automatically acquiring updated software without the need for extensive user interaction. However, as with the '772 Halliwell et al. system, the software update system disclosed in the '204 Yinger et al. patent must be initiated by some form of user interaction at a work-station or client computer, and does not provide for any method of remote access to the client by a server for purposes of diagnosis or the collection of statistical information.

Patch or update files that allow for correcting or updating the automotive diagnostic system software also could be downloaded to the vehicle wheel alignment system from the Internet in a similar fashion. Methods and applications for patch updating of software in an incremental fashion to navigation systems are described generally in U.S. Pat. No. 5,893,113 to McGrath et al. The '113 patent describes a method by which a geographical data set, broken out into a series of transactions, can be utilized to update a vehicle navigation system by sending and receiving, in a specific order, each of the transactions which comprises the entire geographical data set to be updated. Such a system, however, provides no flexibility to analyze data, and is limited in the types of services and forms of communication between the data store and the receiving unit.

BRIEF SUMMARY OF THE INVENTION

Briefly stated, an embodiment of the apparatus of the present invention is of a wheel alignment system which includes at least one sensing device for acquiring automotive data, interface circuitry in communication with the sensing device for generating data representative of automotive data acquired by the sensing device, and a host computer in communication with the interface circuitry for performing a sequence of operations on the data generated by the interface circuitry. The host computer provides integrated network access to allow for transmission to the vehicle wheel alignment system from a remote server, via a communications link, updated information and access to web service applications necessary to accurately diagnose a vehicle, and the return of diagnostic, statistical, and log information associated with the vehicle wheel alignment system. In the preferred embodiment, the host computer provides integrated Internet access to allow for transmission of statistical information such as alignment logs, error messages, status messages, or diagnostic information to a remote system, and for the receipt of information including updated software applications, access to web services, diagnostic commands, and remote information queries therefrom.

As a method, the present invention involves the remote diagnosis, repair, and updating of software applications on vehicle wheel alignment systems from a remote computer system via a communications link such as the Internet, as well as the collection of statistical information from one or more vehicle wheel alignment systems at the remote computer system. Upon either receipt of a signal from an identified vehicle wheel alignment system, or operator command, the remote computer system accesses, via the communications link, the identified vehicle wheel alignment system and extracts diagnostic information relating to the operating status of the vehicle wheel alignment system. The remote computer system analyzes the extracted diagnostic data, and responsive to the analysis, transmits one or more commands to the vehicle wheel alignment system and/or updates or provides access to software applications and services associated with the vehicle wheel alignment system. In addition to extracting diagnostic information, the remote computer may extract and process statistical information associated with the accessed vehicle wheel alignment system to facilitate the diagnosis, repair, and updating or access to the software applications and services on one or more the vehicle wheel alignment system.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believe to be the best mode of carrying out the invention.

Figure 1A:
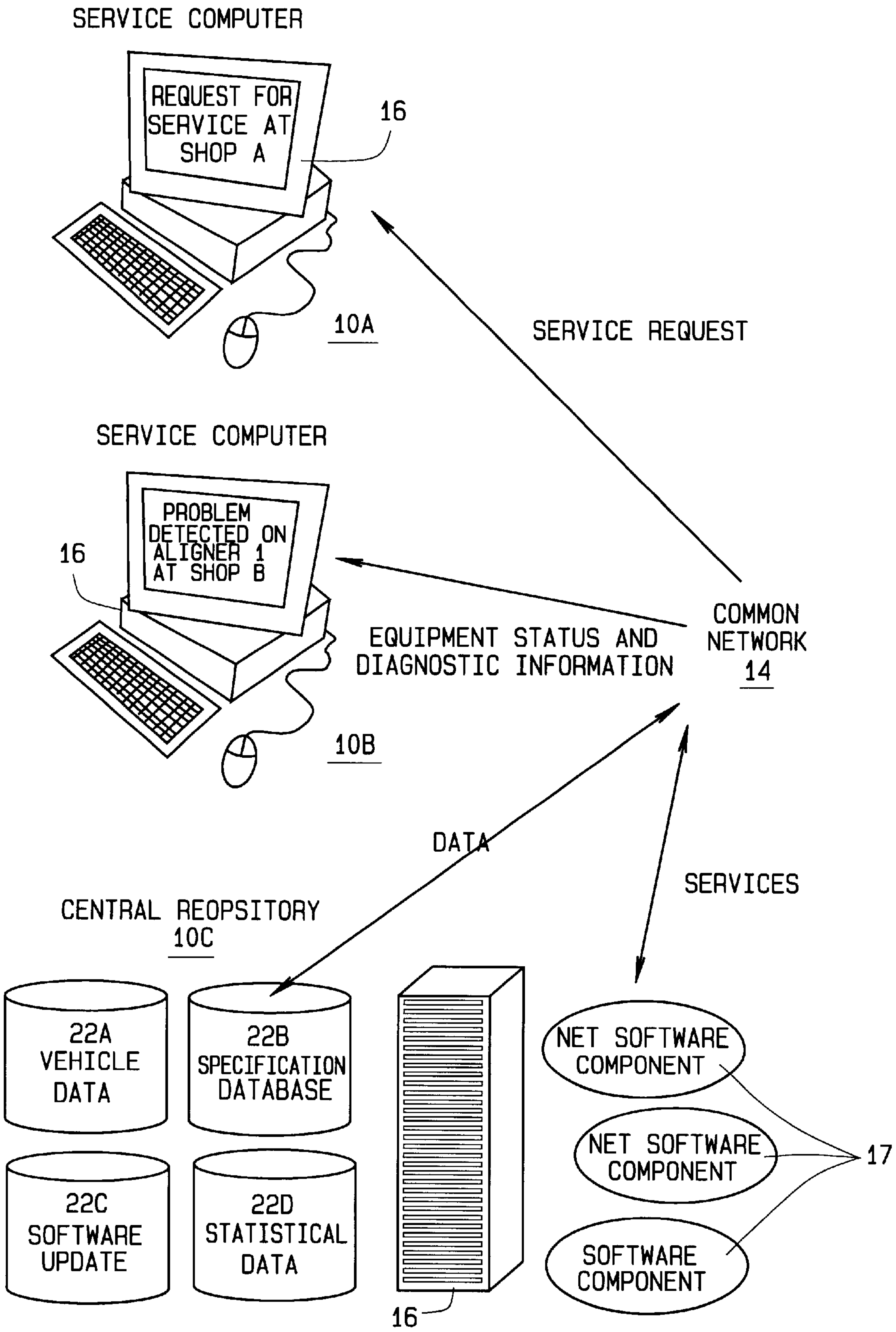
FIG. 1A is an overview illustration of the interconnections between components of the present invention.
Figure 1B:
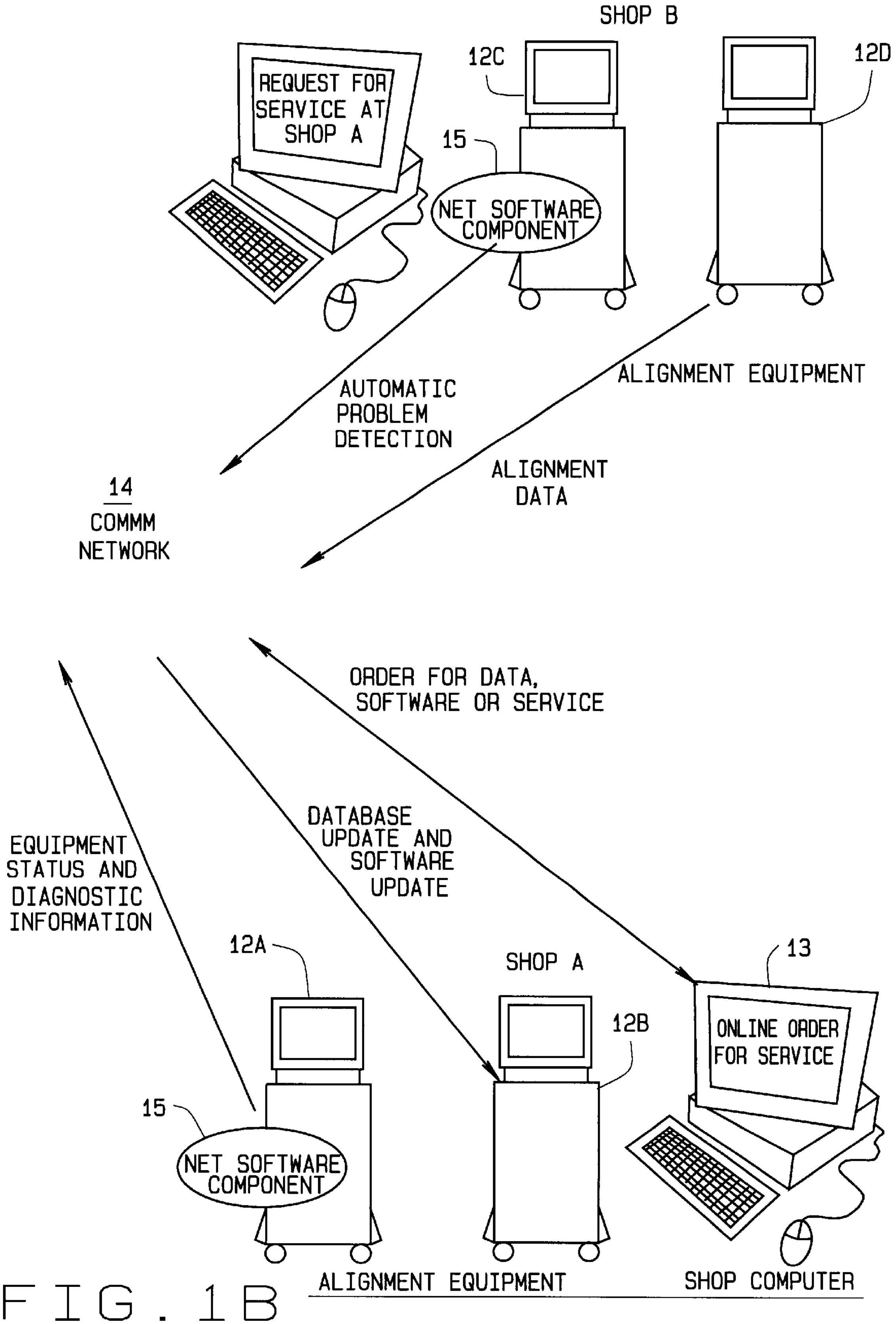
FIG. 1B is a continuation of FIG. 1A, illustrating the interconnections between components of the present invention.

Properly operating wheel alignment system components are critical to the efficient servicing of wheel alignment problems on late model vehicles. As illustrated in FIGS. 1A and 1B, one or more remote computers or systems 10A–10C are provided with access to one or more individual vehicle wheel alignment system computers 12A–12D or shop management computers 13 via a bi-directional communications network 14, such as the Internet, for the purpose of providing resources and services to, obtaining information from, and for performing remote diagnostic procedures on, the wheel alignment system computers 12A–12D and shop management computers 13.

It will be recognized that the scope of this invention is not limited in the number of wheel alignment system computers 12A–12D and the number of remote computers or systems 10A–10C which may be interconnected, and accordingly, subsequent references to single wheel alignment computers and/or to single remote computers or systems are equally applicable to multiple units unless otherwise specified.

Figure 2:
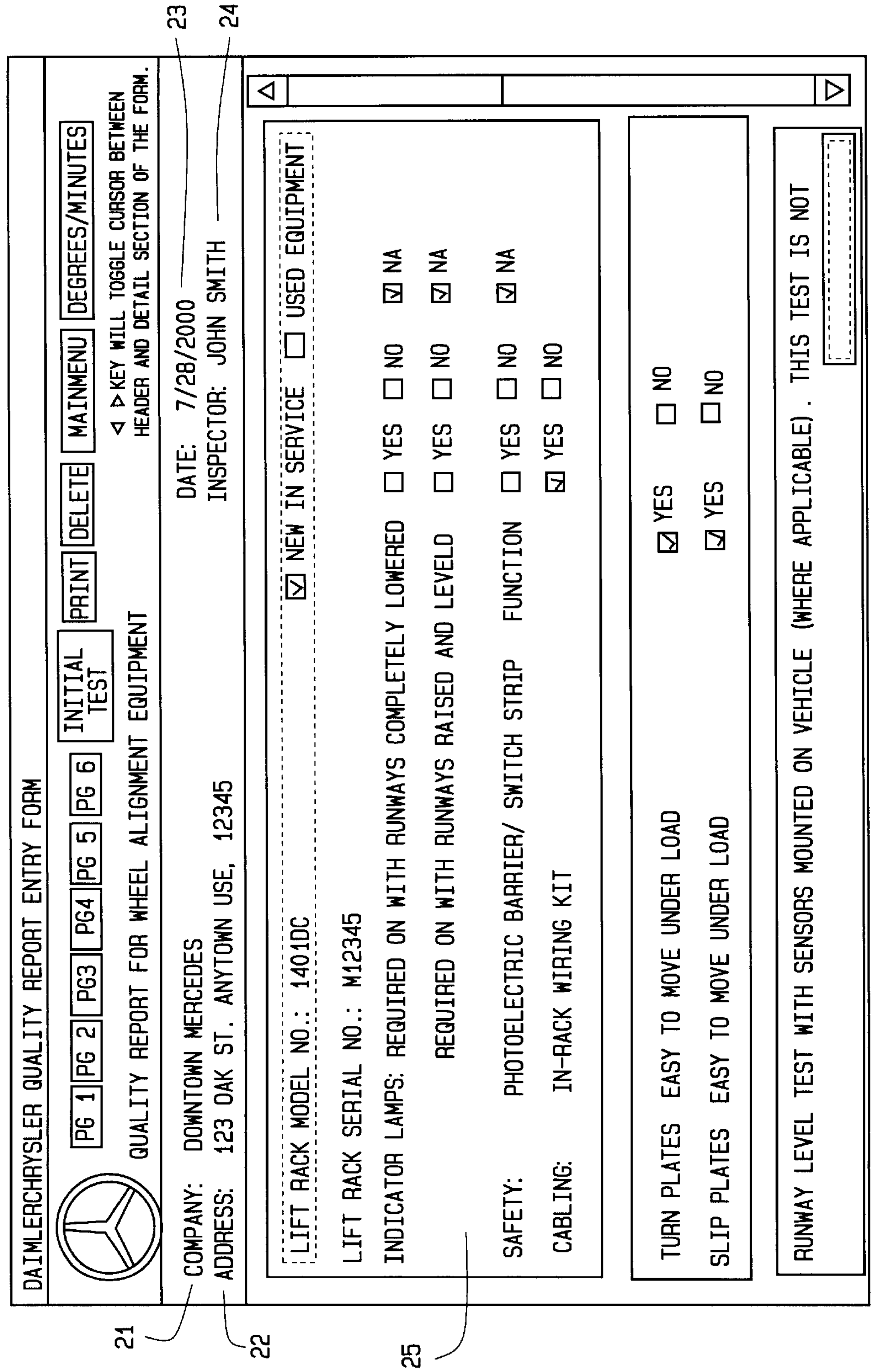
FIG. 2 is an illustration of a wheel alignment system display screen showing a report generating screen prior to sending data to a remote system
Figure 3:
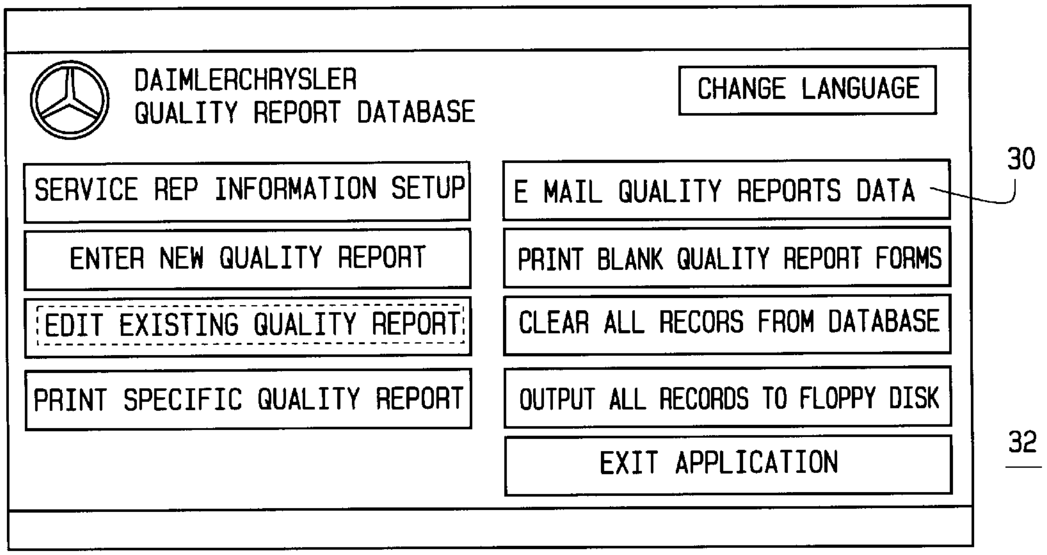
FIG. 3 is an illustration of a wheel alignment system display screen showing options for sending data to a remote system via email.

In this manner, the individual vehicle wheel alignment computers 12A–12D will have a reduced need for periodic software updates, and may be routinely serviced, queried, or diagnosed from a remote location, or from one or more of the remote service computers 10A–10C configured with the appropriate service software, reducing the need for service personnel to travel to the physical location of each vehicle wheel alignment computer 12A–12D. Thus, in the preferred embodiment, a general purpose computer or a specialized logic circuit in each vehicle wheel aligner is adapted to allow for data communication with the one or more remote computers or remote systems 10A–10C via the bi-directional communications network 14, such as the Internet or other conventional network. It is to be understood that a conventional protocol for communicating with a local or global computer information network, such as the Internet, is implicit in the interconnection between the wheel alignment system computers 12A–12D, the communications network 14, and the remote systems 10. In the case of a global communications network, the transmission control protocol/Internet protocol (TCP/IP) presently is a preferred protocol for use as a communications interface, although it will be appreciated that alternate communication protocols, such as DISCO, SOAP, and XML and software applications such as Internet browser applications and "dot"-NET Web Services may be implemented and utilized without altering the scope of the invention. Furthermore, data may be exchanged between the vehicle wheel alignment computers 12A–12D and the remote service computers 10A–10C via electronic mail protocols. For example, as seen in FIGS. 2 and 3, an electronic mail message containing data, such as an equipment quality report 20, may be composed either automatically or by a technician for transmission to a remote service computer. The equipment quality report 20 may include identifying information such as a company name 21, address 22, date 23, and technician 24. Additionally included may be specific information 25 pertaining to the equipment to which the report pertains. Electronic mail messages may be transmitted from the vehicle wheel alignment computer automatically, or by the technician selecting a "Send" option 30 from a menu 32 of available choices. The electronic mail messages are delivered over the communications network 14 and received by the remote service computer in a conventional manner, which then extracts the required data from the associated message.

In a first alternate embodiment of the present invention, each of the wheel alignment system computer 12A–12D is configured with vehicle wheel alignment software designed to utilize a variety of local and remote Microsoft "dot"-NET Web Services software components 15 to run on top of a "dot"-NET runtime system and utilize the features of a "dot"-NET framework to provide vehicle wheel alignment features. These software components may be written in a wide variety of computer languages, including C#, Visual Basic, C++, Cobol, Perl, Java, JScript and VBScript or may be partially implemented using Active Server Pages (ASP or ASP+) which are web pages with embedded code written in a scripting language. The actual operation of the vehicle wheel alignment software may take place either in an operating system itself, such as a Microsoft Windows interface, or may be partially implemented from within another program such as an Internet browser application.

Local “dot”-NET Web Services software components 15 are implemented and stored on the individual wheel alignment computer systems 12A–12D while the remote “dot”-NET WEB Services software and components 17 are located on the remote systems 10A–10C. For example, the remote services and components 17 may comprise an alignment unit services software application, configured to provides services such as data acquisition, data storage, logging, software updates, and repair procedures to the wheel alignment computer systems 12A–12D. Each of the service components 15, 17 may be written in any one of a variety of different computer languages, but conform to the required “dot”-NET Web Services protocols for standardized interfaces, and may be accessed over the communications network 14, such as the Internet, using SOAP or other suitable protocol such as HTTP, XML, or FTP. Local “dot”-NET Web Services 15 associated with the individual wheel alignment computer systems 12A–12D may be accessed from the remote system 10A–10C or from other computer systems linked to the wheel alignment computer systems 12A–12D via the communications network 14, such as the Internet connection. These local “dot”-NET Web Services 15 are configured to provide pathways to access status information, configuration information, statistical information, or other information relating to the status of the wheel alignment system with which they are associated. Additionally, local “dot”-NET Web Services 15 may be configured to provide the remote systems 10A–10C with access to diagnostic and repair procedures associated with the individual wheel alignment computer systems 12A–12D.

The remote “dot”-NET Web Services 17 associated with the remote system 10A–10C are accessible by the, individual wheel alignment computer systems 12A–12D via their respective communications network 14 connections, such as Internet connections, and are configured to permit the alignment computer systems 12A–12D to transfer information to the remote system, to access and run specific software components, and to acquire software updates which are stored on the remote system 10A–10C. Each of the remote “dot”-NET Web Services 17 includes a complete “self-description” available in a standard format, such as XML, which includes details about the methods, properties, interfaces, and events supported by the service, as well as descriptive documentation in one or more languages. By utilizing remote “dot”-NET Web Services 17, those of ordinary skill in the art will readily recognize that the remote services required by the individual wheel alignment computer systems 12A–12D may be stored on multiple remote systems 10A–10C. For example, one remote system 10C may be configured with remote services 17 responsible for updating software components, while a second remote system may be configured with remote services for acquiring and accumulating statistical information from the individual wheel alignment computer systems 12A–12D, or to provide security by controlling access the alignment systems and remote systems. Additionally, a third party remote system may be utilized via remote services, such as Microsoft’s “Passport” service which maintains information on the identity of individuals, thereby facilitating Internet-based transactions.

In a second alternate embodiment of the present invention, the remote systems 10A–10C includes one or more service computers 16 configured with software, such as that discussed above utilizing “dot”-NET protocols, designed to provide services to, access data at, and receive data from one or more wheel alignment system computers 12A–12D over the communications network 14, such as the Internet, and to analyze the accessed and received data. Each wheel alignment system computer 12A–12D is configured to transmit the data to the service computer 16 either in response to a query received from the service computer 16, automatically upon the detection of a predetermined condition, or automatically upon the occurrence of a scheduled event. The service computer software is configured to analyze the data transmitted from the wheel alignment computer 12A–12D and received over the communications network 14 to extract useful information pertaining to the operation of the wheel alignment system from which the data was transmitted. Useful information extracted from the transmitted data by the service computer software includes the identification of failed hardware components in the wheel alignment system, wheel aligner status information such as hardware and software configurations, and wheel aligner usage information which may be accumulated over a period of time. For example, information accumulated over a period of time related to the usage of the wheel alignment system may include statistical information identifying the number and type of wheel alignment procedures performed, specific information as to the makes and models of vehicles repaired or serviced, and usage information for individual features or components of the wheel alignment system. Additional information which the remote system software may be configured to retrieve from the wheel alignment computer may include software application and database version numbers, elapsed time since the associated wheel alignment hardware has been calibrated, and current program log files for performing error-detection. Additionally, the received information from the wheel alignment computers 12A–12D may be utilized by the service computer software in the generation of reports or other summary data compilations for presentation to an operator on a display screen or printer.

In a third alternate embodiment, the remote system software is configured to perform one or more actions following the analysis of the transmitted and received data. For example, the remote system software may be configured to transfer service data, updated software, or diagnostic commands to the wheel alignment system computer 12A–12D over the communications network 14. Alternatively, upon the detection of an error condition at a wheel alignment system during the analysis by the remote system software, the remote system software may perform one or more diagnostic functions by transmitting one or more diagnostic commands to the wheel alignment system and analyzing any results which are returned to the service computer 16. From the returned and analyzed results, the service computer software is configured to take a corrective action, such as remotely updating a software module or routine on the wheel alignment computer 12A–12D via the communications network 14, or signaling an on-site repair technician to replace a defective hardware component.

Those of ordinary skill in the art will readily recognize that the configuration of the service computer software need not be required to respond to the transmission and receipt of data from a wheel alignment system before performing a function such as a software update or the acquisition of statistical or diagnostic information. Rather, the service computer software may be configured to perform such operations at predetermined intervals or upon operator command. For example, a updated software module may be provided to the service computer 16 for distribution to, and installation at, all wheel alignment computers 12A–12D meeting a predetermined set of criteria, such as those configured with a specific hardware option. Under such conditions, the service system software is configured to communicate with each of the identified wheel alignment computers over the communications network 14, transferring and installing the appropriate software update as needed.

In a fourth alternate embodiment, the service computer 16 of the remote system 10 is configured to store, in one or more repositories or databases 22A–22D, the information received over the communications link 14 from wheel alignment computers as described above. The repositories or databases may be either centralized in a single location or decentralized/distributed, located at remote locations 10C and linked via the communications network 14, such as the Internet, using suitable protocols, such as "dot"-NET protocols or FreeNet protocols, to provide virtual data storage facilities for both the remote systems 10A and 10B and each of the wheel alignment computer systems 12A–12D. For example, data may be stored and accessed transparently in each of the repositories or databases 22A–22D using XML or other suitable Internet protocols. Bach repository or database 22A–22D includes a suitable and conventional storage medium, for example a large hard drive or high-speed tape storage system. The stored information, such as statistical data, configuration data including warranty information for wheel aligner components, or vehicle data may be of a cumulative nature, and may be subsequently analyzed by the software of the service computer 16 or another system for purposes of identifying commonly serviced motor vehicles, defective component failures on the wheel alignment systems, diagnostic histories, or other trends deemed useful for purposes of delivering efficient wheel alignment service to an end user. Additionally stored in each repository or database 22A–22D may be a variety of wheel alignment software applications, such as current and previous versions of software modules required to operate wheel alignment hardware components. Using the "dot"-NET protocols, multiple versions of wheel alignment software or components may be installed on wheel alignment computer system 12A–12D without conflict, to provide varying degrees of functionality and maintain compatibility with older and out-dated hardware components. The service computer software may be configured to access the information stored in the repository or database 22A–22D and to transfer portions of the information over the communications link 14 to one or more wheel alignment computers 12A–12D as required, either to update the wheel alignment computer software, provide requested information in response to a query, or upon the detection of a predetermined condition or event. Alternatively, the service computer software may be configured to utilize the information stored in the repository or database 22A–22D to filter technical or repair information requested by a service technician to facilitate the repair of an identified wheel alignment system, based upon the specific type of problem detected at that wheel alignment system.

Figure 4:
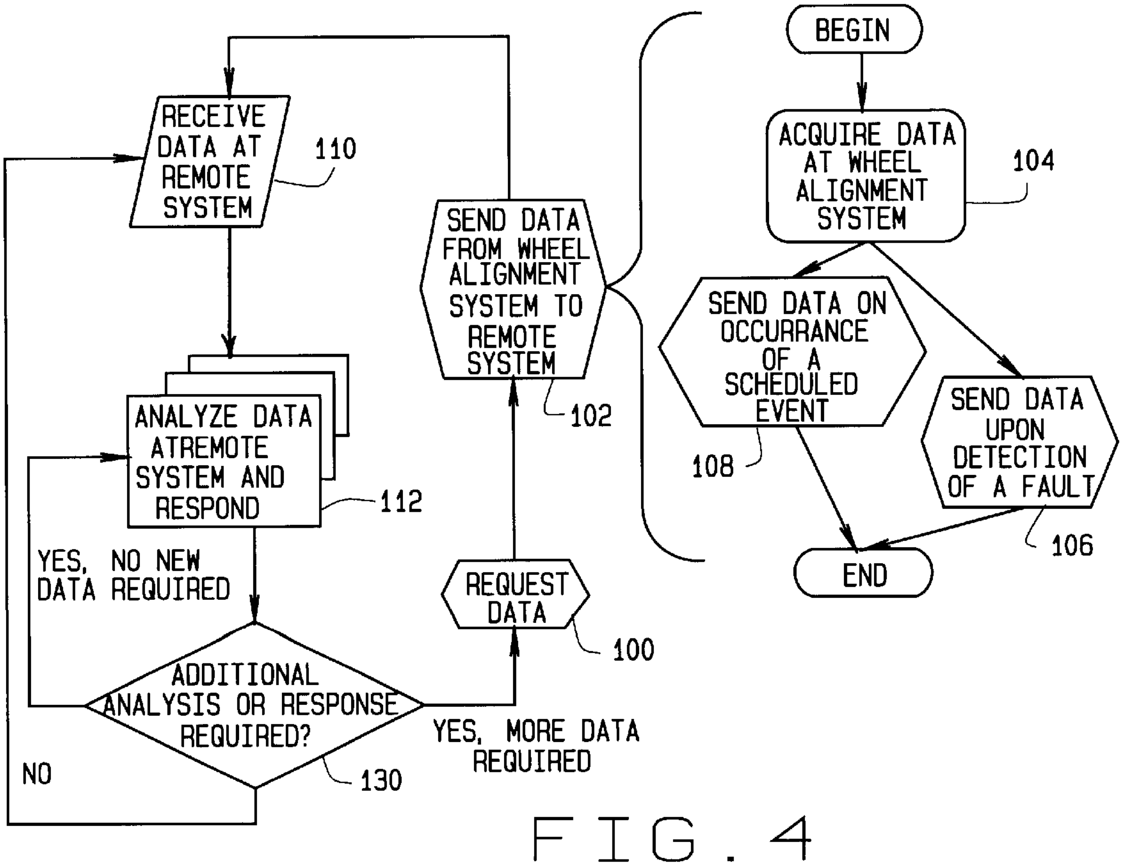
FIG. 4 is a flow chart illustrating the method for networked communications and services of the present invention.
Figure 5:
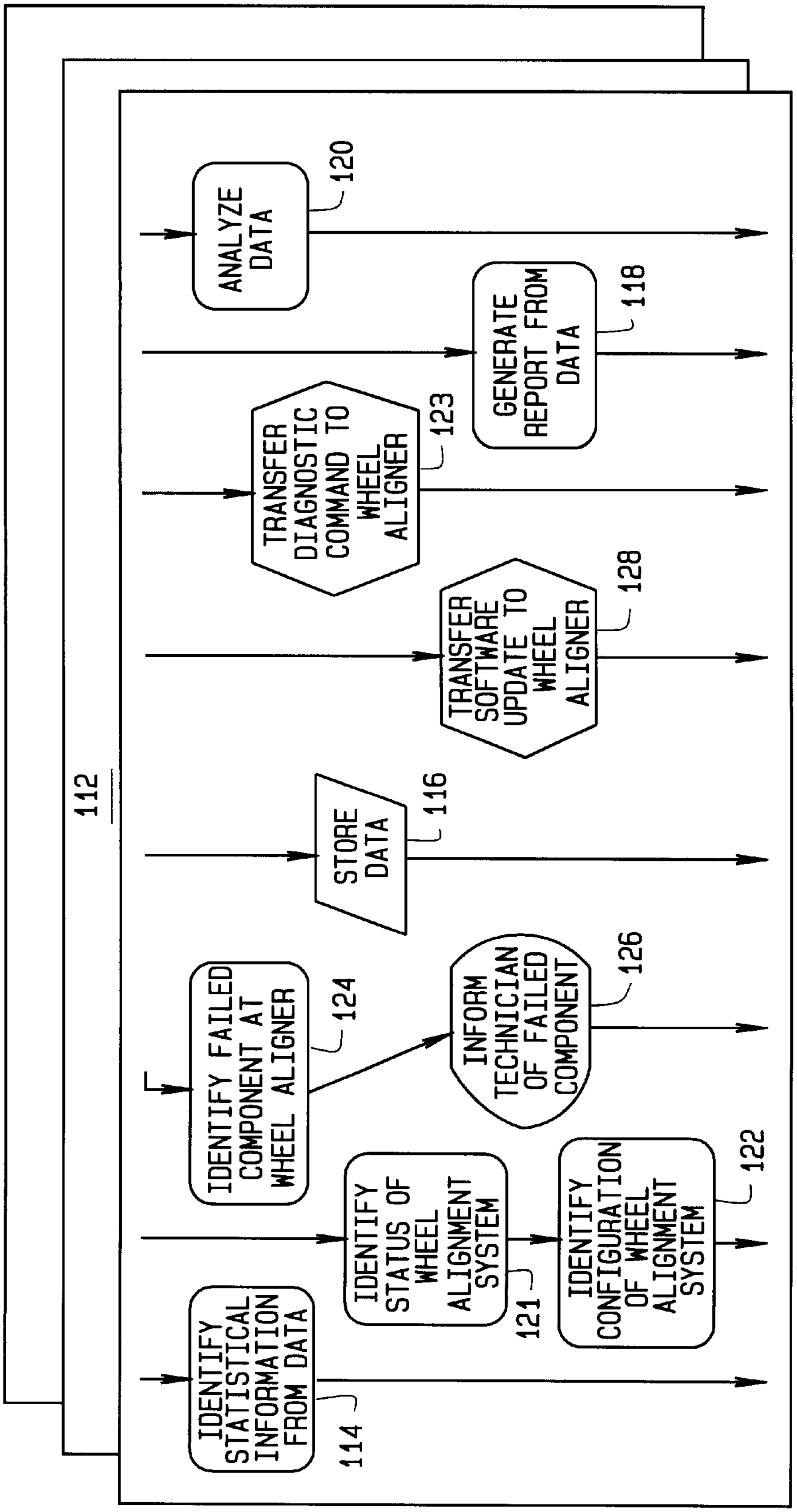
FIG. 5 is an enlargement of a portion of FIG. 4, illustrating different action which may be performed by the remote service system.

Turning to FIGS. 4 and 5, As a method, the present invention utilizes several different modes of operation to effectuate the transfer of information between one or more vehicle wheel alignment system computers 12A–12D and a remotely located server computer 16 configured with appropriate software as described above. In a first method of operation, the server computer 16 queries the computers 12A–12D associated with the wheel alignment systems over the communications network 14 to receive desired data (Box 100). The queries may be sent out on a predetermined schedule, or in response to an operator input command. Information requested and received from the wheel alignment systems (Box 102) may include, but is not limited to, software version numbers, status information, configuration information such as hardware or software configurations, system usage information or logs, and calibration data. As an alternative method of operation, the individual wheel alignment system computers 12A–12D acquire data (Box 104) and may query or initiate a transfer of data to the server computer 16 upon the occurrence of a predetermined event, such as a hardware component failure (Box 106), or after a predetermined period of time has expired (Box 108). For example, the individual alignment system computers 12A–12D may request from the service computer 16 that a repair technician be dispatched to the location to effectuate a hardware repair or calibration of the alignment system, or may request updated vehicle specifications or software. Individual wheel alignment computers 12A–12D may maintain log files of hardware or software failures, and may request from the computer 16 a service or diagnostic analysis anytime a specific failure occurs, or only after a predetermined number of repeated error conditions are detected.

Following the receipt of data from a wheel alignment computer 12A–12D (Box 110), the server or remote system computer 16 identifies the type of data received, and performs one or more operations associated with the identified type of data (Box 112). For example, if the received data is cumulative statistical information (Box 114), the server 10 will index and store the received data (Box 116) in a repository or database 22A–22D for subsequent retrieval, report generation (Box 118, or trend analysis (Box 120). Reports may include information such as the frequency of calibrations, the frequency of failure in components, the status of the wheel alignment system hardware (Box 121), and the status of the wheel alignment system software (Box 122). Inventory reports may also be generated to facilitate automated inventory control procedures. Trend analysis may include the identification of the frequency of use of alignment system components, the types of alignments performed, the types of vehicles serviced, and customer feedback, etc. Additional reports may be generated from cumulative statistics to determine the quality of specific hardware components by observing, for example, the number of failures thereof and the mean or average time between failures. Alternatively, if the received data is a fault indication, or a request for service, the server or remote system computer 16 may initiate a diagnostic routine (Box 123) in an attempt to remotely diagnose (Box 124) and correct the detected fault in the wheel alignment system, or inform a technician thereof (Box 126). This cycle may be repeated numerous times (Box 130), with the remote system computer 16 requesting additional information from the wheel alignment system (Box 100), or merely awaiting the arrival of new data (Box 110).

Figure 6:
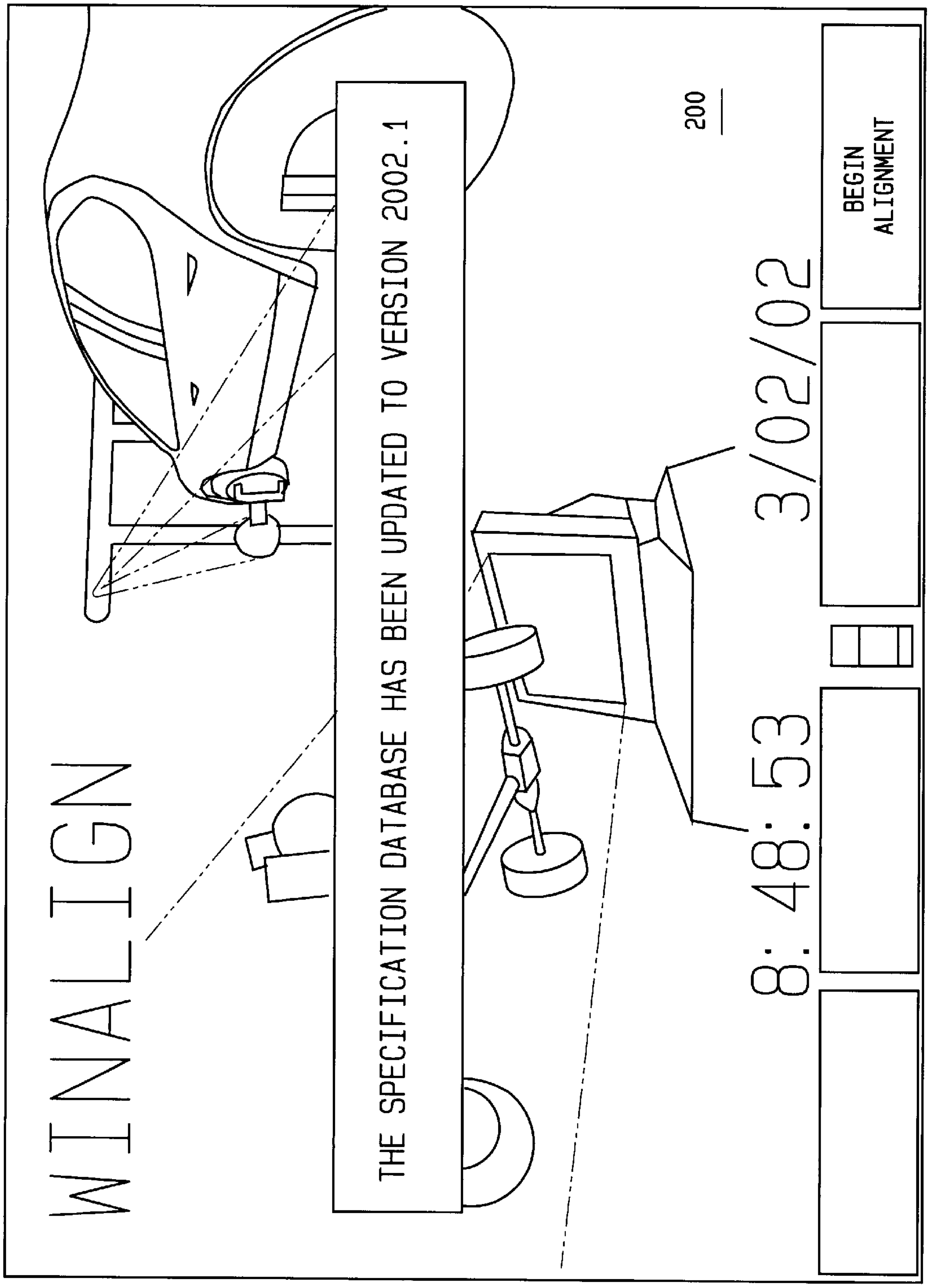
FIG. 6 is an illustration of an informational message displayed to the operator of a wheel alignment system after an update has been made to the wheel alignment system by a remote server.

Analysis of the data received from the alignment systems may be performed by the software of the server 10A–10C to identify out-of-date software versions or databases installed on individual alignment system computers 12A–12D. Upon the identification of such out-of-date software or databases, the server 10A–10C may directly access the alignment system computer 12A–12D over the communications network 14 and perform a software or database update (Box 128), by transferring and installed the most up-to-date information thereon. As seen in FIG. 6, following a successful transfer and installation of software or database update, a confirmation screen 200 will be displayed to the operator of the wheel alignment computer 12A–12D to which the transfer was completed, identifying the changes which were made.

Alternatively, a server 10A–10C provides an operator or service technician with remote access to each individual alignment system computer 12A–12D in communication with a server 10A–10C over the communication link 14. The operator or service technician may utilize the server 10A–10C and communication link 14 to perform remote diagnosis or repair of individual alignment system computers 12A–12D by viewing diagnostic files transferred from the alignment system computer, or directly modifying software and database files on the alignment system computer via the communication link 14. Such remote diagnosis and repair reduces or eliminates the need for a service technician to travel to the physical location of the alignment system computer 12A–12D, particularly for the repair of software relate problems Furthermore, by performing a remote diagnosis prior to traveling to the physical location of an individual alignment system, a service technician may identify via the communications link 14 and the server 10A–10C those hardware components of the alignment system which are in need of repair or replacement, and may ensure the availability of the needed components.

An alternative embodiment of the present invention may additionally include the transmission from the server 10A–10C to the individual wheel alignment computers 12A–12D, via the communication link 14, of notification information. For example, notifications may be transmitted regarding the availability of optional services, software, or updates to the recipient wheel alignment systems. Furthermore, geographic locations of individual wheel alignment systems could be identified and stored in an accessible database online at the server 10A–10C for access via the Internet or other communications link 14 by consumers, to aid potential customers in locating nearby shops offering desired levels of service.

Those of ordinary skill in the art will further recognize that a variety of methods and systems may be implemented to facilitate payment for services offered and rendered by use of the apparatus and methods of the present invention set forth above. In one alternate embodiment, the system of the present invention may be configured to facilitate electronic commerce wherein automotive repair shop technicians or wheel alignment system operators may place orders for services or information from the remote computer 16 through the alignment system computers 12A–12D and associated communications links 14. Such services or orders may be paid for using the communication link 14 to transfer suitable payment information, such as pricing, credit card or other payment account information. Conventional electronic commerce protocols, such as the Electronic Commerce Modeling Language (ECML) which designates standardized information formats and Digital Wallets, may be utilized with the present invention to facilitate payment for services or products ordered through the remote system computer 16. To ensure security, all electronic commerce transactions may utilize the Secure Socket Layer (SSL) technology when transferring information over the communications link.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for remote diagnostic repair of a vehicle wheel alignment system by a remote system over a communication link, the method comprising the steps of:

transferring, from said vehicle wheel alignment system to said remote system over said communication link utilizing NET protocols, at least one packet of information related to the operational status of said vehicle wheel alignment system;

analyzing, at said remote system, said transferred at least one packet of information; and responsive to said analysis, said remote system performing a diagnostic action associated with said vehicle wheel alignment system.

2. The method of claim 1 for diagnostic repair of a vehicle wheel alignment system from a remote system wherein the step of analyzing said transferred at least one packet of information identifies at least one component fault in said vehicle wheel alignment system.

3. The method of claim 1 for diagnostic repair of a vehicle wheel alignment system from a remote system wherein said diagnostic action comprises the step of transferring, from said remote system to said vehicle wheel alignment system over said communication link utilizing NET protocols, at least one NET Web Services software component.

4. The method of claim 1 for diagnostic repair of a vehicle wheel alignment system from a remote system wherein said diagnostic action comprises the step of transferring, from said remote system to said vehicle wheel alignment system over said communication link utilizing NET protocols, at least one diagnostic command.

5. The method of claim 1 wherein said transferred at least one packet of information includes data identifying the configuration of said vehicle wheel alignment system.

6. A method for communicating information between a vehicle wheel alignment system and a remote computer over a communication link, the method comprising the steps of:

transferring from said vehicle wheel alignment system to said remote computer over said communication link utilizing NET protocols, at least one packet of information related to the operation of said vehicle wheel alignment system;

analyzing, at said remote computer, said transferred at least one packet of information; and responsive to said analysis, said remote computer performing an action associated with said at least one packet of information.

7. The method of claim 6 for communicating with a vehicle wheel alignment system from a remote computer wherein said at least one packet of information includes data accumulated over a period of time.

8. The method of claim 7 for communicating between a vehicle wheel alignment system and a remote computer wherein the step of analyzing said transferred at least one packet of information includes identifying usage information associated with said vehicle wheel alignment device.

9. The method of claim 6 for communicating between a vehicle wheel alignment system and a remote computer wherein said at least one packet of information includes statistical information.

10. The method of claim 6 for communicating between a vehicle wheel alignment system and a remote computer wherein said step of transferring said at least one packet of information related to said vehicle wheel alignment device is responsive to a predetermined condition.

11. The method of claim 10 for communicating between a vehicle wheel alignment system and a remote computer wherein said predetermined condition is a scheduled event.

12. The method of claim 10 for communicating between a vehicle wheel alignment system and a remote computer wherein said predetermined condition is the detection of at least one system fault in said vehicle wheel alignment system.

13. The method of claim 6 wherein said action associated with said at least one packet of information includes storing said at least one packet of information in at least one repository associated with said remote computer.

14. The method of claim 6 wherein said step of transferring said at least one packet of information via said communications link includes the steps of:

composing an electronic mail message containing said at least one packet of information to said remote computer; and transmitting said composed electronic mail message over said communications link to said remote computer; and extracting, at said remote computer, said at least one packet of data from said electronic mail message.

15. The method of claim 13 wherein said received at least one packet of information includes cumulative statistical data.

16. The method of claim 15 wherein said action associated with said at least one packet of information includes analyzing said received at least one packet of data to identify at least one trend.

17. The method of claim 16 wherein said at least one trend includes component failure statistics.

18. The method of claim 13 wherein said received at least one packet of information includes wheel alignment system configuration data.

19. The method of claim 13 wherein said received at least one packet of information includes vehicle repair data.

20. The method of claim 13 wherein said transferring of said at least one packet of information is responsive to a signal from said remote computer transmitted over said communications link.

21. The method of claim 20 wherein said signal is transmitted at a predetermined interval.

22. The method of claim 13 wherein said action associated with said at least one packet of information includes generating, at said remote computer, a report utilizing said received at least one packet of information.

23. The method of claim 13 wherein said action associated with said at least one packet of information includes providing filtered technical information to said vehicle wheel alignment system.

24. The method of claim 23 wherein said filtered technical information is specific to a problem identified at said least one vehicle wheel alignment system.

25. A distributed automotive vehicle service system comprising:

at least one vehicle wheel alignment unit, said at least one vehicle wheel alignment unit including at least one vehicle wheel alignment sensor, a general purpose computer configured with vehicle wheel alignment software interconnected to said at least one vehicle wheel alignment sensor, and a first communications interface;

a service processor, said service processor located remote from each said at least one vehicle wheel alignment unit, said service processor configured with a second communications interface, and at least one diagnostic software application;

a communications link establishing a bi-directional data pathway between said first and second communications interfaces; and wherein said service processor is further configured to access data associated with said at least one vehicle wheel alignment unit over said communications link.

26. The distributed automotive vehicle service system of claim 25 wherein said service processor is further configured to modify said data associated with said at least one vehicle wheel alignment unit.

27. The distributed automotive vehicle service system of claim 26 wherein said data associated with said at least one vehicle wheel alignment unit comprises at least one software application.

28. The distributed automotive vehicle service system of claim 25 wherein said service processor is configured responsive to said at least one vehicle wheel alignment unit condition to access said data associated with said at least one vehicle wheel alignment unit over said communications link.

29. The distributed automotive vehicle service system of claim 25 wherein said service processor is configured to access, at predetermined intervals, said data associated with said at least one vehicle wheel alignment unit over said communications link.

30. The distributed automotive vehicle service system of claim 29 wherein said service processor is configured to signal an operator upon identification in said accessed data of a predetermined condition.

31. A distributed automotive vehicle service system comprising:

at least one vehicle wheel alignment unit, said at least one vehicle wheel alignment unit including at least one vehicle wheel alignment sensor, a general purpose computer configured with vehicle wheel alignment software interconnected to said at least one vehicle wheel alignment sensor, and a first communications interface, said vehicle wheel alignment software comprising a plurality of first software components configured to utilize NET runtime protocols;

at least one remote computer system located remotely from each said at least one vehicle wheel alignment unit, said at least one remote computer system configured with a second communications interface;

an Internet link establishing a bi-directional data pathway between said first and second communications interfaces;

wherein said first and second communications interfaces are each compatible with NET protocols.

32. The distributed automotive vehicle service system of claim 31 wherein said remote computer system is configured with alignment unit services software, said alignment unit service software comprising a plurality of second software components configured to utilize NET runtime protocols.

33. The distributed automotive vehicle service system of claim 32 wherein at least one of said first software components is a NET web service component; and at least one of said second software components is a NET web service component.

34. The distributed automotive vehicle service system of claim 33 wherein said NET web service components are configured to be accessible over said Internet link with Simple Object Access Protocol.

35. The distributed automotive vehicle service system of claim 33 wherein said NET web service components are configured to be accessible over said Internet link with at least one Internet protocol.

36. The distributed automotive vehicle service system of claim 32 herein at least one of said first plurality of software components is accessible by said alignment unit services software application over said Internet link.

37. The distributed automotive vehicle service system of claim 36 wherein said at least one accessible software component is configured to provide status information on said vehicle wheel alignment unit.

38. The distributed automotive, vehicle service system of claim 36 wherein said at least one accessible software component is configured to provide statistical information on said vehicle wheel alignment unit.

39. The distributed automotive vehicle service system of claim 36 wherein said at least one accessible software component is configured to provide configuration information on said vehicle wheel alignment unit.

40. The distributed automotive vehicle service system of claim 32 wherein at least one of said second plurality of software components is accessible by said vehicle wheel alignment software over said Internet link.

41. The distributed automotive vehicle service system of claim 40 wherein said at least one accessible software component is configured to receive information from said vehicle wheel alignment unit.

42. The distributed automotive vehicle service system of claim 40 wherein said at least one accessible software component is configured to provide software updates from said at least one remote computer system to said vehicle wheel alignment unit.

43. The distributed automotive vehicle service system of claim 32 wherein at least one of said first plurality of software components is located remote from said vehicle wheel alignment unit;

wherein at least one of said second plurality of software components is located remote from said at least one remote computer system; and said remotely located software components are accessible utilizing NET protocols.

44. The distributed automotive vehicle service system of claim 32 wherein each of said software components includes an XML self-description.

45. The distributed automotive vehicle service system of claim 32 wherein at least one of said first plurality of software components is an Active Server Page; and at least one of said second plurality of software components is an Active Server Page.

46. A distributed automotive vehicle service system comprising:

at least one vehicle wheel alignment unit, said at least one vehicle wheel alignment unit including at least one vehicle wheel alignment sensor, a general purpose computer configured with two or more versions of vehicle wheel alignment software compatible with NET protocols, said general purpose computer interconnected to said at least one vehicle wheel alignment sensor and to the Internet.

* * * * *